United States Patent [19]

Elbert

[11] 4,320,820

[45] Mar. 23, 1982

[54] SECTION INSULATOR WITH IMPROVED ARC CONTROL

[75] Inventor: Charles F. Elbert, Mansfield, Ohio

[73] Assignee: Harvey Hubbell Incorporated, Orange, Conn.

[21] Appl. No.: 172,689

[22] Filed: Jul. 28, 1980

[51] Int. Cl.³ .............................................. B60M 1/18
[52] U.S. Cl. ...................................... 191/39; 200/147
[58] Field of Search ................... 200/144, 147; 191/39

[56] References Cited

U.S. PATENT DOCUMENTS

| | | | |
|---|---|---|---|
| 532,905 | 1/1895 | Potter . | |
| 946,546 | 1/1910 | Hoxie | 191/39 |
| 1,440,511 | 1/1923 | Wahlberg . | |
| 1,451,559 | 4/1923 | Wahlberg . | |
| 1,623,787 | 4/1927 | Hilliard . | |
| 1,799,720 | 4/1931 | Zingg . | |
| 1,866,495 | 7/1932 | Wedmore . | |
| 2,185,263 | 1/1940 | McClure | 191/39 |
| 2,362,759 | 11/1944 | Matthes | 191/39 |
| 2,414,200 | 1/1947 | Hanna et al. | 191/39 |
| 2,488,307 | 11/1949 | Matthes | 191/39 |
| 2,488,308 | 11/1949 | Matthes | 191/39 |
| 2,492,300 | 12/1949 | Lewis | 191/39 |
| 2,593,970 | 4/1952 | Brahmer et al. | 191/39 |
| 2,821,594 | 1/1958 | Latour | 200/87 |
| 2,922,926 | 1/1960 | Fehling | 317/11 |
| 2,995,638 | 8/1961 | Souchet | 200/147 |
| 3,082,307 | 3/1963 | Greenwood et al. | 200/144 |
| 3,813,502 | 5/1974 | Bommart | 191/39 X |

Primary Examiner—Richard A. Schacher
Attorney, Agent, or Firm—Jerry M. Presson

[57] ABSTRACT

An improved trolley system section insulator having a main support insulator, end support insulators attached to trolley wires and an intermediate runner member. The runner member is formed of two spaced conductive portions which are attached to the main support insulator by studs extending upwardly through the main support insulator, the studs being electrically connected together at their uppermost ends, thereby forming 90° changes in direction of the current paths which exist when arcs are formed. The path changes produce magnetic fields which tend to blow the arcs downwardly, protecting the insulator portions from arc damage.

3 Claims, 3 Drawing Figures

SECTION INSULATOR WITH IMPROVED ARC CONTROL

This invention relates to a method and apparatus for controlling an arc and particularly for controlling the direction of movement of an arc which can occur across gaps in a trolley section insulator to minimize damage caused by the arc.

BACKGROUND OF THE INVENTION

It is common practice in many circumstances, notably including coal mines, to use vehicles which are electrically powered and to supply the vehicles with power through a trolley wire and a current collector, or trolley shoe, carried by the vehicle. The current collector slides or rides along the energized trolley wire which is commonly mounted overhead. Relatively high current flows in the trolley wire when one or more vehicles are moving.

The trolley wire is commonly supported at its ends by a structure known as a section insulator which has blocks of insulating material supporting aligned but longitudinally spaced apart sections of trolley wire, leading the shoe or current collector from one energized trolley wire at one side of the section insulator to another energized wire, to a grounded section of trolley wire, or to an unenergized section on the other side. A long and complex network of trolley wires may be divided into separately powered sections by such a structure. In either case, but particularly with one side of the section insulator grounded, a large potential difference can exist across the gaps existing between longitudinally spaced ends of the trolley wire sections. This circumstance can lead to the production of an arc across the gaps, especially when the traveling shoe bridges the gaps as it runs across the section insulator. A structure of this general type is shown in U.S. Pat. No. 2,492,300, Lewis.

As will be recognized, arcs are characterized by high current density accompanied by ionization and the production of significant heat. The direction in which the arc travels is highly variable but because of the heat generated the arc often tends to rise toward the insulating structure of the section insulator and, in doing so, it has a highly detrimental effect on the structure, drastically shortening its useful life.

BRIEF DESCRIPTION OF THE INVENTION

An object of the present invention is to provide a technique for controlling the direction of movement of an arc discharge formed in the gap between trolley wire sections in a section insulator.

A further object is to provide an improved trolley section insulator having a current path through a central section for producing a magnetic field in a direction to cause the arc across a gap therein to be blown down and away from the portions thereof subject to damage.

A still further object is to provide such a device which which requires very little structural change to the section insulator but is highly effective in arc control.

Briefly described, the invention includes an improved section insulator for a trolley system, the section insulator being of the type having a first elongated support member of insulating material, second and third support members fixedly attached below and at opposite ends of the first support member for retaining the ends of electrically conductive trolley wires in substantially aligned relationship and an intermediate runner member supported by the first support member between and longitudinally spaced from both the second and third members, the runner member having a surface substantially aligned with the trolley wires retained by the second and third members such that a current collector can longitudinally pass sequentially along the aligned wires and surface, the improvement comprising first and second electrically conductive bodies forming said intermediate runner member, first and second elongated electrically conductive shafts attached to said first and second bodies and extending upwardly through said first support member for holding said first and second bodies in longitudinally spaced aligned relationship with each other and with said trolley wires, and an electrical conductor extending between and interconnecting the upper ends of said shafts to form a current path which abruptly diverges from and returns to the path along which the trolley wires are aligned for producing magnetic fields adjacent said first and second bodies tending to blow down arcs forming between the ends of said runner member and said trolley wires.

In order that the manner in which the foregoing and other objects are attained in accordance with the invention can be understood in detail, particularly advantageous embodiments thereof will be described with reference to the accompanying drawings, which form a part of this specification, and wherein.

Figure 2:
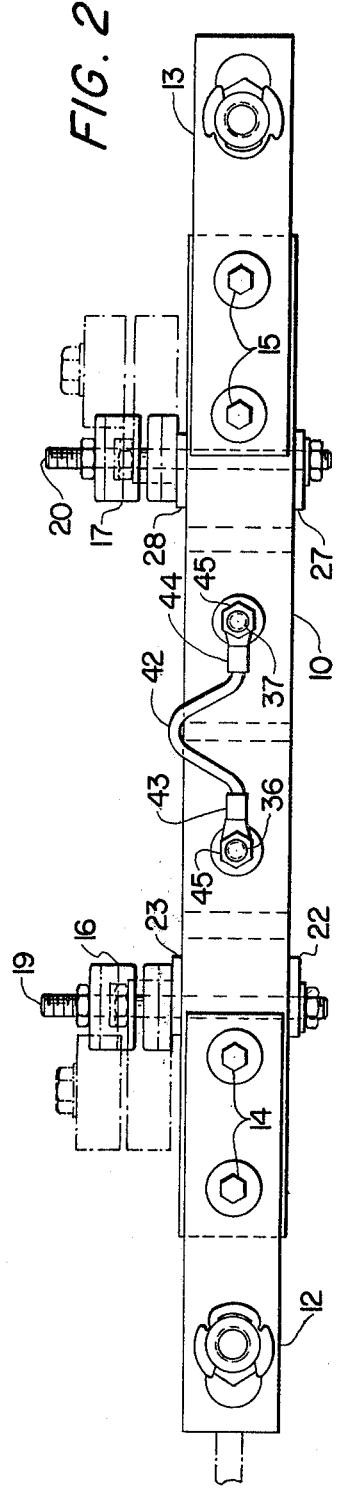
FIG. 2 is a top plan view of the section insulator of FIG. 1.
Figure 1:
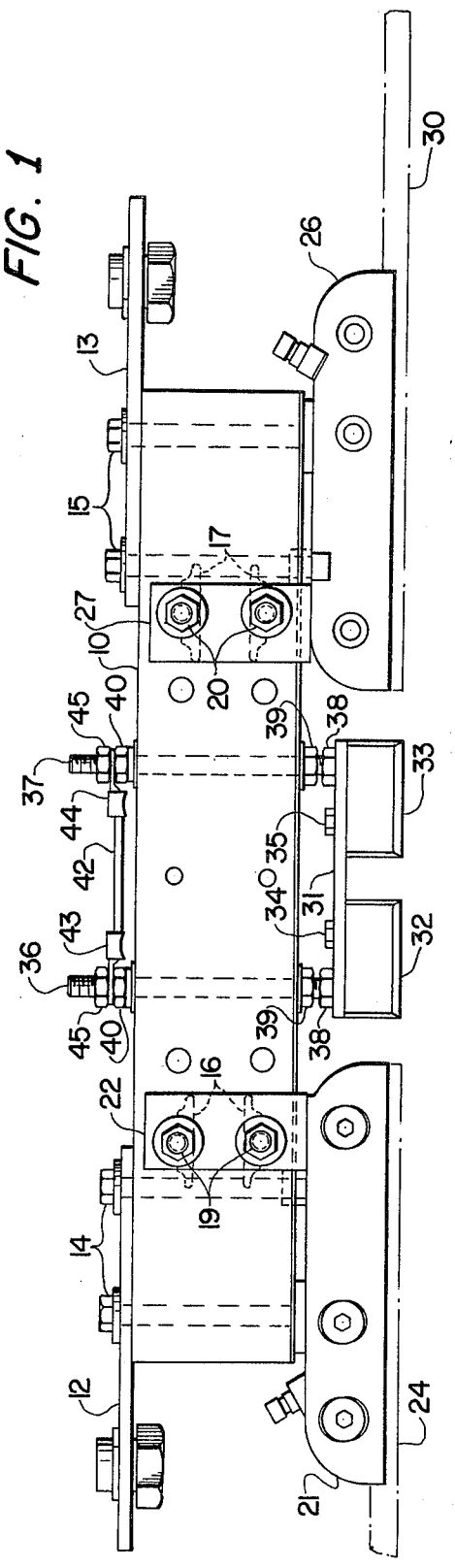
FIG. 1 is a side elevation of an improved section insulator in accordance with the present invention.

Turning now to the drawings in detail, FIGS. 1 and 2 show an improved section insulator in accordance with the invention which includes a first elongated support member 10 which is a substantially rigid, generally rectangular body made of an insulating material such as glass-filled polyester. At opposite ends of member 10 are brackets 12 and 13, respectively, which are provided to attach the entire assembly to a support surface. Brackets 12 and 13 are attached to member 10 by bolts 14 and 15 which pass vertically through member 10. On the back of the assembly are feeder cable clamps 16 and 17, best seen in FIG. 2 and in dashed lines in FIG. 1, which are attached by threaded studs 19 and 20 and nuts thereon. These clamps hold feeder cables which can deliver power through studs 19 and 20 to one or both of bracket arms 22, 23 and 27, 28 and to contact wires 24 and 30.

At one end of member 10 is a second support member 21 which is attached, as by silver—soldering, to a U-shaped bracket having the upwardly extending bracket arms 22 and 23, member 21 being attached to member 10 by bolts 14. Support member 21 is provided with conventional means for engaging and retaining the end of a trolley wire 24. This second support member, which can also be refered to as an end runner assembly, is predominantly of electrically conductive material. The trolley wire 24 is also conventional, and it will be recognized that the nature and size of the trolley wire will depend upon the characteristics of the system with which the section insulator is used.

At the opposite end of member 10 is a third support member 26 which attached by silver—soldering to a U-shaped bracket having bracket arms 27 and 28 extending upwardly therefrom on opposite sides of member 10, the bracket arms being electrically connected by bolts 20 to the feeder cable clamp 17, member 26 being attached below member 10 by bolts 15. As with member 21, member 26 which can also be referred to as an end runner assembly, has conventional means for supporting the end of a trolley wire 30. It will further be observed that trolley wires 24 and 30 are held in substantially coaxial, aligned relationship, and that the distal ends thereof are longitudinally separated from each other by a space which is normally in the order of about 7 inches.

In that space there is provided a plate 31 of insulating material, which can also be glass polyester, and which carries two bodies 32 and 33 of electrically conductive material such as steel. Bodies 32 and 33 are fixedly attached to plate 31 by cap screws 34 and 35 and by elongated studs 36 and 37 which threadedly engage bodies 32 and 33, pass through plate 31 and extend upwardly through member 10, the studs being secured to the plate and member 10 by sets of lock nuts 38, 39 and 40. Studs 36 and 37 are electrically conductive and can be, for example, bronze. Studs 36 and 37 protrude beyond the upper surface of member 10 and lock nuts 40 a sufficient distance to permit the attachment of an electrical conductor 42 which has ring connectors 43 and 44 attached thereto, the ring connectors surrounding the upper ends of the studs and being firmly connected thereto by locknuts 45.

Figure 3:
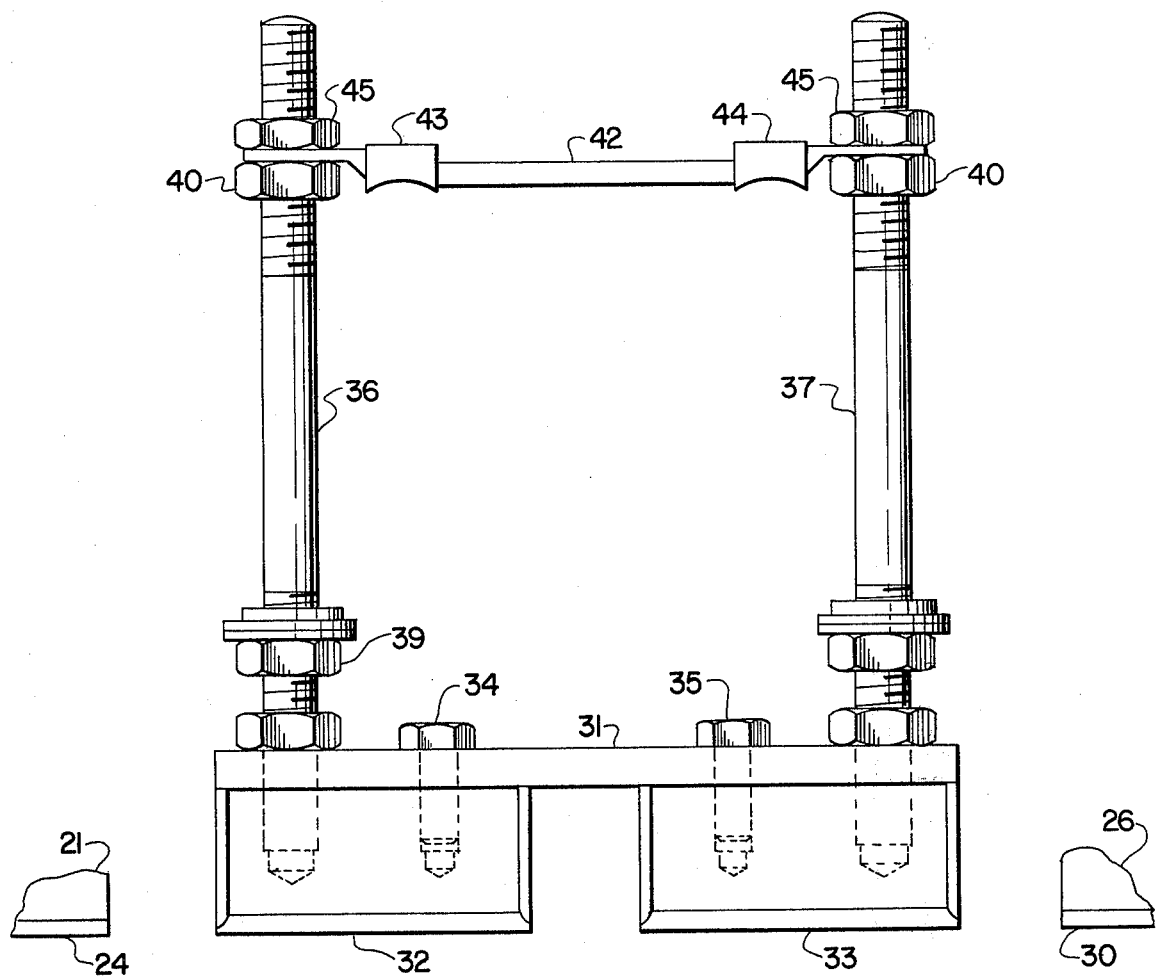
FIG. 3 is an enlarged side elevation of the central portion of the section insulator, showing electrically conductive portions thereof and with the main insulating central section omitted.

This structure is also seen in FIG. 3 wherein bodies 32 and 33, plate 31 and studs 36 and 37 are shown in an enlarged view with body 10 omitted so that, except for plate 31, the components illustrated are the electrically conductive portions of that section of the apparatus. It will be observed that there are two major structural differences in the central portion of the insulating section from a conventional device. One of these differences has to do with the fact that the intermediate runner portion is divided into two electrically conductive bodies 32 and 33 rather than being a single body. The other difference is that the supporting studs 36 and 37 attached to those bodies are intentionally made good electrical conductors and are connected together, near their upper ends, by the shunt wire 42. It will also be observed that studs 36 and 37 enter bodies 32 and 33 near the outer ends of those bodies, i.e., at locations relatively close to the gaps between those bodies and the trolley wires 24 and 30.

As previously indicated, the problem with arcing commonly arises as the current collector, or shoe, bridges the gap between the end of a trolley wire and a portion of the intermediate runner. Assuming that wire 24 is the "hot" or energized wire, and that wire 30 is grounded, and assuming that the shoe carried by the vehicle is arriving from trolley wire 24, the gap between wire 24 and body 32 will be bridged first, and as the shoe traverses this gap and leaves wire 24 an arc is commonly struck across that gap. The separation between bodies 32 and 33 and the arrangement of the electrical circuit including stud 36, wire 42 and stud 37 provides a shunt current path characterized by an abrupt change in direction at the left end of body 32 closest to wire 24. It has been found that this abrupt change in direction produces a magnetic field which acts in the gap between wire 24 and body 32 which causes any arc produced in that gap to be blown downwardly and away from those insulating portions of the structure which could be detrimentally effected by the arc, particularly supporting members 21 and 10.

A similar action takes place at the gap between body 33 and wire 30 across which an arc can be produced as the shoe passes across that gap and onto wire 30. The abrupt change in direction of the current path between stud 37 and wire 30 similarly acts to blow the arc downwardly, i.e., away from the stud itself.

While it does not appear to be necessary to discuss the theory of operation in great detail, it is believed that the concentration in flux produced by the abrupt change in current path of about 90°, with the current path being that through the arc across the gap and then to the stud, a concentration of flux density occurs at the inside of the "elbow" thus formed which blows the arc in the direction of least flux density. Laboratory tests have demonstrated that this is a significant improvement and results in sufficient arc control to extend the insulator life by orders of magnitude. The beneficial effect has been observed with changes in current collector speeds across the gaps, changes in gap spacing, changes in current magnitude, and with both positively and negatively by energized trolley wire.

It will be observed that the existence of shunt wire 42 eliminates the possibility of an arc across the gap between bodies 32 and 33 so long as the current carrying elements including the studs are sufficiently conductive and large enough to handle the currents involved, which currents can be in the order of hundreds of amperes.

An alternative arrangement to that shown in FIGS. 1-3 can be provided by extending electrical conductors laterally away from bodies 32 and 33 and providing a shunt across the remote ends of such conductors. Thus, if in the embodiment of FIG. 2 studs were arranged to extend upwardly away from bodies 32 and 33, the arc would be blown out of the gap in the opposite direction, i.e., in a downward direction as seen in FIG. 2. However, a major objective of the invention is protection of the insulative portions of the structure, and it is therefore desirable to blow the arc directly away from the structure to be protected. Additionally, it is most efficient to make use of the supporting structure for bodies 32 and 33 as part of the arc control circuit.

While certain advantageous embodiments have been chosen to illustrate the invention it will be understood by those skilled in the art that various changes and modifications can be made therein without departing from the scope of the invention as defined in the appended claims.

What is claimed is:

1. An improved section insulator for a trolley system, the section insulator being of the type having a first elongated support member of insulating material, second and third support members fixedly attached below and at opposite ends of said first support member for retaining the ends of electrically conductive trolley wires in substantially aligned relationship and an intermediate runner member supported by said first support member between and longitudinally spaced from said second and third members, said runner member having a surface substantially aligned with the trolley wires retained by said second and third members such that a current collector can longitudinally pass respectively along the aligned wires and surface, the improvement comprising:

first and second electrically conductive bodies forming said intermediate runner member;

first and second elongated electrically conductive shafts attached to said first and second bodies and extending upwardly through said first support member for holding said first and second bodies in longitudinally spaced aligned relationship with each other and with said trolley wire;

an electrical conductor extending between and interconnecting points near the upper ends of said shafts to form with said first and said second electrically conductive bodies and said shafts a current conductive path which abruptly diverges from and returns to the path along which the trolley wires are aligned for producing magnetic fields tending to blow down arcs forming between the ends of said runner member and said trolley wires.

2. An improved section insulator according to claim 1 and further comprising a plate of insulating material fixedly attached to said first and second bodies.

3. An improved section insulator according to claim 2 wherein said shafts comprise threaded studs passing through said first member and said plate, and wherein, each of said bodies is provided with a threaded bore to receive an end of one of said studs.

* * * * *